(12) United States Patent
Tei

(10) Patent No.: US 11,342,989 B2
(45) Date of Patent: May 24, 2022

(54) METHOD FOR MEASURING TRANSMISSION LOSS OF OPTICAL FIBER AND OTDR MEASUREMENT DEVICE

(71) Applicant: SUMITOMO ELECTRIC INDUSTRIES, LTD., Osaka (JP)

(72) Inventor: Chonde Tei, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/059,015

(22) PCT Filed: May 28, 2019

(86) PCT No.: PCT/JP2019/021089
§ 371 (c)(1),
(2) Date: Nov. 25, 2020

(87) PCT Pub. No.: WO2019/230720
PCT Pub. Date: Dec. 5, 2019

(65) Prior Publication Data
US 2021/0211194 A1 Jul. 8, 2021

(30) Foreign Application Priority Data
May 29, 2018 (JP) .............................. JP2018-102289

(51) Int. Cl.
*H04B 10/07* (2013.01)
*H04B 10/071* (2013.01)
(Continued)

(52) U.S. Cl.
CPC .......... *H04B 10/071* (2013.01); *G01M 11/30* (2013.01); *H04B 10/07* (2013.01); *H04B 10/07955* (2013.01)

(58) Field of Classification Search
CPC ................ H04B 10/071; H04B 10/07; H04B 10/07955; G01M 11/30; G01M 11/00; G01M 11/02
(Continued)

(56) References Cited

U.S. PATENT DOCUMENTS 5,032,025 A * 7/1991 Bateman ............ G01M 11/3145
356/73.1
5,062,704 A * 11/1991 Bateman ............ G01M 11/3145
356/73.1
(Continued)

FOREIGN PATENT DOCUMENTS

| JP | S58-191947 A | 11/1983 |
|---|---|---|
| JP | 2000-39378 A | 2/2000 |

(Continued)

OTHER PUBLICATIONS

Celikel, Oguz, et al., "Determination of attenuation coefficients of single mode optical fiber standards to be used in OTDR calibrations," Optics & Laser Technology, 2004, vol. 37, No. 5, pp. 420-426, ISSN; 0030-3992.

*Primary Examiner* — Dibson J Sanchez
(74) *Attorney, Agent, or Firm* — Faegre Drinker Biddle & Reath LLP

(57) ABSTRACT

This method includes a reference optical fiber transmission loss measurement step for measuring a reference optical fiber transmission loss measurement value, a difference value calculation step for subtracting the transmission loss reference value from the reference optical fiber transmission loss measurement value and calculating a transmission loss difference value, and a measured-optical-fiber measurement step for measuring the transmission loss of an optical fiber to be measured, the reference optical fiber transmission loss measurement step being repeatedly performed, a transmission loss difference value being calculated by performing the difference value calculation step each time a reference (Continued)

optical fiber transmission loss measurement value is obtained, a correction value being calculated on the basis of a plurality of transmission loss difference values, the measurement value obtained in the measured-optical-fiber measurement step being corrected using the correction value, and the transmission loss value of the optical fiber to be measured being determined.

6 Claims, 2 Drawing Sheets

(51) Int. Cl.
*H04B 10/079* (2013.01)
*G01M 11/00* (2006.01)

(58) Field of Classification Search
USPC .......................................................... 398/9–38
See application file for complete search history.

(56) References Cited

U.S. PATENT DOCUMENTS

| | | | |
|---|---|---|---|
| 5,329,392 A * | 7/1994 | Cohen ................ | G01M 11/3154 398/13 |
| 5,790,285 A * | 8/1998 | Mock .................... | H04B 10/07 356/73.1 |
| 5,943,123 A * | 8/1999 | Oshimi .............. | G01M 11/3145 356/73.1 |
| 6,369,883 B1 * | 4/2002 | Clark .................... | G01N 21/59 250/228 |
| 6,459,478 B1 | 10/2002 | Schmidt et al. | |
| 8,711,341 B2 * | 4/2014 | Blair .................. | G01M 11/3136 356/73.1 |
| 9,240,855 B1 * | 1/2016 | Lam .................... | H04J 14/0212 |
| 9,360,392 B2 * | 6/2016 | Benjamin .......... | G01M 11/3145 |
| 2007/0025676 A1 * | 2/2007 | Russell ................ | G02B 6/4482 385/134 |
| 2008/0085114 A1 * | 4/2008 | Nakajima ............ | H04B 10/071 398/33 |
| 2009/0245476 A1 * | 10/2009 | Lindqvist ................ | H04B 3/48 379/32.04 |
| 2015/0117854 A1 * | 4/2015 | Straub ................ | H04B 10/079 398/25 |
| 2015/0198503 A1 * | 7/2015 | Leblanc ................ | G01M 11/31 356/73.1 |
| 2016/0164601 A1 | 6/2016 | Perron | |
| 2019/0137355 A1 * | 5/2019 | Nakatani ..................... | G01M 11/3136 |

FOREIGN PATENT DOCUMENTS

| | | |
|---|---|---|
| JP | 2003-207413 A | 7/2003 |
| JP | 2005-147997 A | 6/2005 |
| JP | 2010-91406 A | 4/2010 |

* cited by examiner

METHOD FOR MEASURING TRANSMISSION LOSS OF OPTICAL FIBER AND OTDR MEASUREMENT DEVICE

TECHNICAL FIELD

The present disclosure relates to a method for measuring a transmission loss of an optical fiber and an OTDR measurement device.

This application is based upon and claims the benefit of priority from Japanese Patent Application No. 2018-102289, filed on May 29, 2018, the entire contents of which are incorporated herein by reference.

BACKGROUND ART

Known is a method for measuring a transmission loss of an optical fiber by an OTDR measurement device. For example, Patent Literatures 1 and 2 describe a measurement method and a correction method for reducing a device error of each OTDR measurement device, that is, a variation in a measurement value of a transmission loss of each OTDR measurement device, at the time of the measurement.

Patent Literature 1 describes a measurement method using the OTDR measurement device (measurement device) in which a predetermined measurement item of one reference optical fiber is measured by a plurality of OTDR measurement devices, and when a measurement value of one of the OTDR measurement devices is out of a predetermined reference range, it is determined that there is an abnormality in the OTDR measurement device, and then a light source is replaced.

Patent Literature 2 describes an OTDR non-linearity correction method. In the correction method, first, a test light is input from one end of the reference optical fiber to measure an OTDR characteristic with respect to a backscattered light, and a linear approximation data thereof is calculated. Next, difference data is calculated from the OTDR characteristic and the linear approximation data, and an OTDR characteristic measured for an optical fiber to be measured is corrected by using the difference data.

CITATION LIST

Patent Literature

Patent Literature 1: JP-A-2005-147997
Patent Literature 2: JP-A-2010-91406

SUMMARY OF INVENTION

A method for measuring a transmission loss of an optical fiber according to one embodiment of the present disclosure includes:

a reference optical fiber transmission loss measurement step for measuring a reference optical fiber transmission loss measurement value by using an OTDR measurement device with respect to a reference optical fiber whose transmission loss reference value is obtained in advance;

a difference value calculation step for calculating a transmission loss difference value by subtracting the transmission loss reference value from the reference optical fiber transmission loss measurement value measured in the reference optical fiber transmission loss measurement step; and a measurement step of an optical fiber to be measured for measuring a transmission loss of the optical fiber to be measured by using the OTDR measurement device, in which the reference optical fiber transmission loss measurement step is repeatedly performed, the transmission loss difference value is calculated by performing the difference value calculation step every time the reference optical fiber transmission loss measurement value is obtained, a correction value is calculated based upon the calculated plurality of transmission loss difference values, a measurement value obtained in the measurement step of the optical fiber to be measured is corrected by using the correction value, and a transmission loss value of the optical fiber to be measured is obtained.

An OTDR measurement device according to one embodiment of the present disclosure includes:

a measurement unit that allows an optical pulse to be input on an optical fiber and measures a transmission loss from a return time and a light amount of a backscattered light from the optical fiber;

a transmission loss difference value calculation unit that calculates a transmission loss difference value by subtracting a previously obtained transmission loss reference value of a reference optical fiber from a measurement value obtained by measuring a transmission loss of the reference optical fiber by the measurement unit;

a storage unit that respectively stores the transmission loss difference values that are respectively calculated for the measurement values of the transmission loss of the reference optical fiber obtained for each measurement when the measurement is repeatedly performed by the measurement unit; and a transmission loss value calculation unit that calculates a correction value based upon the plurality of transmission loss difference values stored in the storage unit, and calculates a transmission loss value of an optical fiber to be measured by correcting a measurement value obtained by measuring a transmission loss of the optical fiber to be measured by the measurement unit by using the correction value.

DESCRIPTION OF EMBODIMENTS

Figure 1:
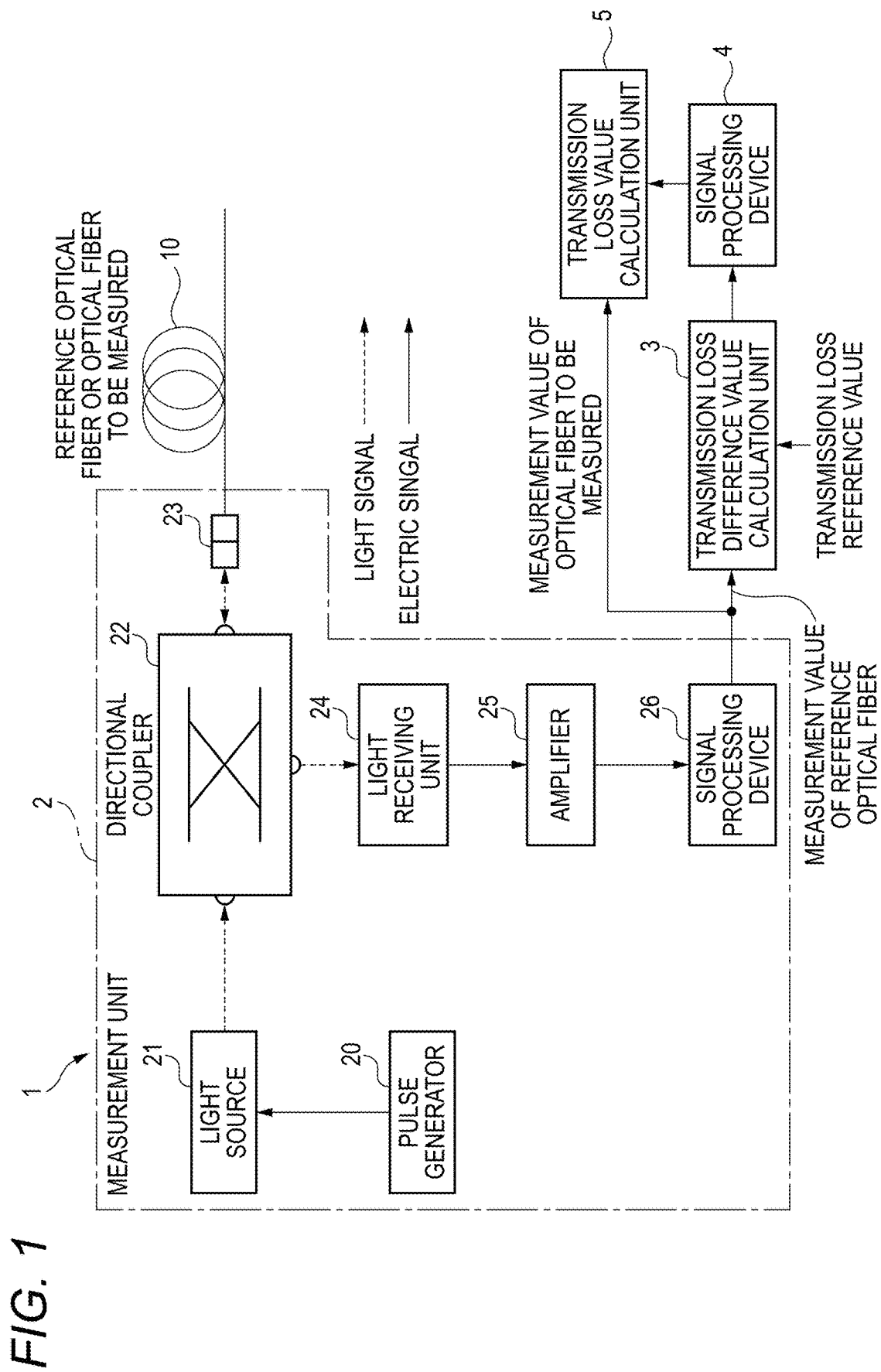
FIG. 1 is a block diagram illustrating a configuration of an OTDR measurement device according to an embodiment of the present disclosure.

Problems to be Solved by the Present Disclosure

Since an abnormality in an OTDR measurement device may occur by a cause other than a light source, the method described in Patent Literature 1 may not be able to eliminate a variation of a measurement value between each OTDR measurement device. As a transmission loss of an optical fiber decreases in recent years, strict quality control according to a standard may be required for the transmission loss of the optical fiber much more than before. Meanwhile, in the correction method described in Patent Literature 2, for example, it is not possible to correct the variation in the measurement value of the transmission loss of the OTDR measurement device caused by a change over time and a change in a temperature environment, such that there is a risk that a quality control for an optical fiber to be measured may be insufficient.

Therefore, an object of the present disclosure is to provide a method for measuring a transmission loss of an optical fiber and an OTDR measurement device in which a variation in a measurement value of a transmission loss caused by a change over time and a change in a temperature environment is corrected, and management for an optical fiber to be measured is sufficiently performed.

Advantageous Effects of the Present Disclosure

According to a method for measuring a transmission loss of an optical fiber and an OTDR measurement device of the present disclosure, a variation in a measurement value of a transmission loss caused by a change over time and a change in a temperature environment is corrected, and a quality control for an optical fiber to be measured is sufficiently performed.

Description of Embodiments of the Present Disclosure

First, the embodiments of the present disclosure will be listed and described.

(1) A method for measuring a transmission loss of an optical fiber according to one embodiment of the present disclosure includes:

a reference optical fiber transmission loss measurement step for measuring a reference optical fiber transmission loss measurement value by using an OTDR measurement device with respect to a reference optical fiber whose transmission loss reference value is obtained in advance;

a difference value calculation step for calculating a transmission loss difference value by subtracting the transmission loss reference value from the reference optical fiber transmission loss measurement value measured in the reference optical fiber transmission loss measurement step; and a measurement step of an optical fiber to be measured for measuring a transmission loss of the optical fiber to be measured by using the OTDR measurement device, in which the reference optical fiber transmission loss measurement step is repeatedly performed, the transmission loss difference value is calculated by performing the difference value calculation step every time the reference optical fiber transmission loss measurement value is obtained, a correction value is calculated based upon the calculated plurality of transmission loss difference values, a measurement value obtained in the measurement step of the optical fiber to be measured is corrected by using the correction value, and a transmission loss value of the optical fiber to be measured is obtained.

According to the method, the reference optical fiber transmission loss measurement is repeatedly performed, the transmission loss difference value is calculated every time the reference optical fiber transmission loss measurement value is obtained, and the correction value is calculated based upon the calculated plurality of transmission loss difference values. Accordingly, the transmission loss difference value is obtained by using the latest measurement value that is considered to be relatively close to a current state among the measurement values obtained by repeatedly performing the reference optical fiber transmission loss measurement. The measurement value of the optical fiber to be measured is corrected by the transmission loss difference value, such that it is possible to correct a variation in the measurement value of the transmission loss caused by a change over time and a change in a temperature environment, and it is possible to sufficiently perform quality control according to a standard for the optical fiber to be measured.

(2) The correction value may be calculated by averaging the plurality of transmission loss difference values obtained in a predetermined period in the order close to a point of time when the measurement step of the optical fiber to be measured is performed.

According to the method, since the correction value is calculated by averaging the plurality of transmission loss difference values obtained in the predetermined period in the order close to the point of time when the measurement step of the optical fiber to be measured is performed, it is possible to more surely correct the variation in the measurement value caused by the change over time and the change in the temperature environment.

(3) The predetermined period may be determined based upon a tendency that the transmission loss difference value changes.

According to the method, the predetermined period is set in a period during which the change in the transmission loss difference value is stable to some extent, and as a result, it is possible to more surely correct the variation in the measurement value.

(4) The reference optical fiber transmission loss measurement step may define an average value of a plurality of measurement values obtained by performing a plurality of times of measurement as the reference optical fiber transmission loss measurement value.

According to the method, since the average value of the plurality of measurement values obtained by performing the plurality of times of measurement is defined as the reference optical fiber transmission loss measurement value, the reference optical fiber transmission loss measurement value is more accurate value.

(5) An OTDR measurement device according to one embodiment of the present disclosure includes:

a measurement unit that configured to measure a transmission loss from a return time and a light amount of a backscattered light from the optical fiber, the backscattered light being caused by inputting an optical pulse into an optical fiber;

a transmission loss difference value calculation unit that calculates a transmission loss difference value by subtracting a previously obtained transmission loss reference value of a reference optical fiber from a measurement value obtained by measuring a transmission loss of the reference optical fiber by the measurement unit;

a storage unit that respectively stores the transmission loss difference values that are respectively calculated for the measurement values of the transmission loss of the reference optical fiber obtained for each measurement when the measurement is repeatedly performed by the measurement unit; and a transmission loss value calculation unit that calculates a correction value based upon the plurality of transmission loss difference values stored in the storage unit, and calculates a transmission loss value of an optical fiber to be measured by correcting a measurement value obtained by measuring a transmission loss of the optical fiber to be measured by the measurement unit by using the correction value.

According to the configuration, by using the OTDR measurement device, reference optical fiber transmission loss measurement is repeatedly performed, the transmission loss difference value is calculated every time a reference optical fiber transmission loss measurement value is obtained, and the correction value is calculated based upon the calculated plurality of transmission loss difference values. Since the measurement value obtained by measuring the optical fiber to be measured is corrected by using the correction value, it is possible to correct a variation in the measurement value of the transmission loss caused by a change over time and a change in a temperature environment, and it is possible to sufficiently perform quality control for the optical fiber to be measured.

Details of Embodiments of the Present Invention

Specific examples of a method for measuring a transmission loss of an optical fiber and an OTDR measurement device according to an embodiment of the present disclosure will be described with reference to the drawings.

The present invention is not limited to these examples but is indicated by the scope of the claims, and is intended to include all the modifications within meanings equivalent to the scope of the claims and within the scope thereof.

FIG. 1 is a block diagram illustrating an example of an OTDR measurement device according to an embodiment of the present disclosure.

As illustrated in FIG. 1, an optical time domain reflectometer (OTDR) measurement device 1 includes a measurement unit 2, a transmission loss difference value calculation unit 3, a storage unit 4, and a transmission loss value calculation unit 5.

The measurement unit 2 measures a transmission loss of an optical fiber from a return time of a backscattered light and a returned light amount thereof by inputting an optical pulse to the optical fiber.

In the measurement unit 2, for example, a light source 21 such as a laser diode is excited by a pulse wave having a constant cycle generated from a pulse generator 20, and a light pulse is generated from the light source 21. The light pulse generated from the light source 21 passes through a directional coupler 22, is input on one end of an optical fiber 10 including a reference optical fiber and an optical fiber to be measured connected via an optical connector 23, and is propagated in the optical fiber 10. Here, the reference optical fiber indicates an optical fiber prepared in advance and has a stable characteristic. The optical fiber having the stable characteristic refers to, for example, an optical fiber manufactured from an intermediate portion of a preform, which has a stable manufacturing condition.

When there is, for example, a break point in the optical fiber 10, the light pulse propagated in the optical fiber 10 is generally totally reflected at the breaking point. In the OTDR measurement, an inclination of a transmission loss characteristic represents a transmission loss of the optical fiber 10. When the optical fiber 10 has a glass abnormality or a winding disorder, a waveform of the transmission loss characteristic is undulated, or a step of the transmission loss characteristic may occur. Therefore, by measuring the transmission loss characteristic, it is possible to detect the transmission loss of the optical fiber 10, and the abnormality in glass or a winding state.

The light pulse reflected in the optical fiber 10 returns to the directional coupler 22 as a backscattered light, and is sent from the directional coupler 22 to a light receiving unit 24. The light receiving unit 24 includes, for example, a built-in avalanche photodiode (APD), and functions as a photoelectric converter that converts the received backscattered light into an electric signal. The electric signal converted by the light receiving unit 24 is amplified by an amplifier 25, and then the amplified electric signal is sent to a signal processing device 26.

The signal processing device 26 performs predetermined processing on the received electric signal, obtains the transmission loss characteristic from the backscattered light, and calculates a transmission loss measurement value of the optical fiber 10 from the inclination of the transmission loss characteristic.

For example, when the optical fiber 10 connected to the directional coupler 22 via the optical connector 23 is the reference optical fiber, the signal processing device 26 calculates the transmission loss measurement value of the reference optical fiber, and transmits the calculated transmission loss measurement value thereof to the transmission loss difference value calculation unit 3.

For example, when the optical fiber 10 connected to the directional coupler 22 via the optical connector 23 is the optical fiber to be measured, the signal processing device 26 calculates the transmission loss measurement value of the optical fiber to be measured, and transmits the calculated transmission loss measurement value thereof to the transmission loss value calculation unit 5.

The transmission loss difference value calculation unit 3 is a calculation unit that calculates a transmission loss difference value which is a measurement deviation of the measurement unit 2 itself by subtracting a transmission loss reference value of the reference optical fiber from the transmission loss measurement value of the reference optical fiber transmitted from the signal processing device 26. The transmission loss difference value calculation unit 3 transmits the calculated transmission loss difference value to the storage unit 4. Here, the transmission loss reference value is a transmission loss which becomes a reference of the reference optical fiber, and indicates a transmission loss of the reference optical fiber which is obtained in advance. The transmission loss reference value may be measured by using, for example, an OTDR measurement device for reference measurement prepared in advance, which has stable measurement performance.

The storage unit 4 is, for example, a memory for storing the transmission loss difference value calculated by the transmission loss difference value calculation unit 3, and the transmission loss reference value and the transmission loss measurement value of the reference optical fiber measured by the measurement unit 2.

The transmission loss value calculation unit 5 is a calculation unit that calculates a correction value for correcting a measurement value of the optical fiber to be measured transmitted from the signal processing device 26. The transmission loss value calculation unit 5 calculates the correction value based upon a plurality of transmission loss difference values stored in the storage unit 4.

The transmission loss value calculation unit 5 is a calculation unit that corrects the measurement value of the optical fiber to be measured transmitted from the signal processing device 26 by using the correction value, and that calculates a transmission loss value of the optical fiber to be measured.

Figure 2:
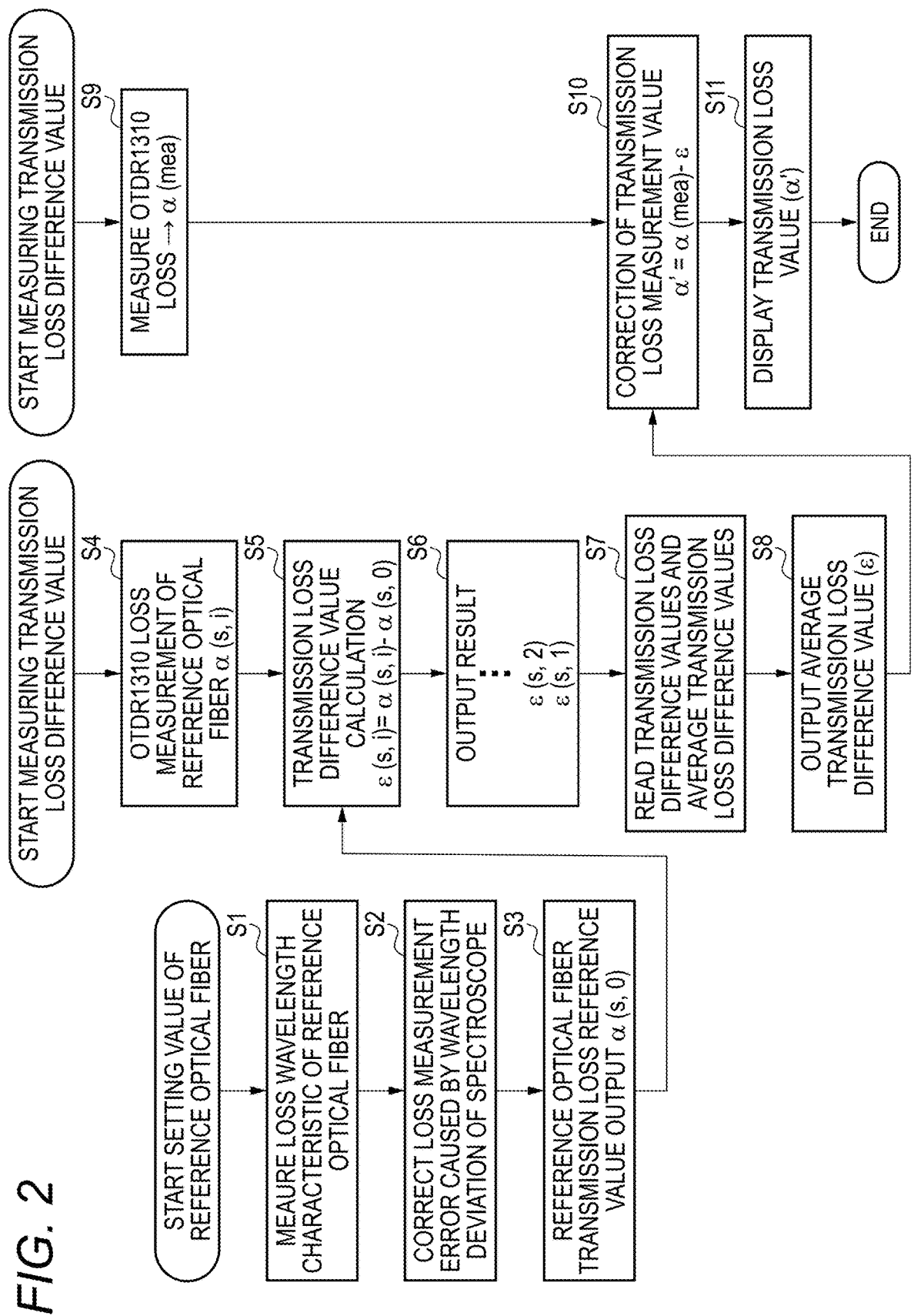
FIG. 2 is a flowchart illustrating an example of a method for measuring a transmission loss of an optical fiber according to the embodiment of the present disclosure.

Next, a method for measuring the transmission loss of the optical fiber using the OTDR measurement device 1 will be described with reference to a flowchart of FIG. 2.

(Start Setting Value of Reference Optical Fiber)

First, a loss wavelength characteristic of the reference optical fiber is measured (step S1). Next, a loss measurement error caused by a wavelength deviation caused by a spectroscope is measured, and the error is corrected (step S2).

A transmission loss reference value α (s, 0), which is a transmission loss of the reference optical fiber, is obtained in advance based upon steps S1 and S2 (step S3). For example, 1310 nm is used as a measurement wavelength of the OTDR (the same shall be applied hereinafter). For example, the transmission loss reference value α (s, 0) is stored in the storage unit 4 of the OTDR measurement device 1.

(Measurement of Transmission Loss Difference Value)

A reference optical fiber transmission loss measurement value, which is the transmission loss of the reference optical fiber, is measured by the measurement unit 2 (Step S4: reference optical fiber transmission loss measurement step). The measurement is performed, for example, once every day at the time of starting a manufacturing operation. When the measurement is performed once, a plurality of times of measurement are performed, and an average value of an obtained plurality of measurement values is defined as the reference optical fiber transmission loss measurement value. The present disclosure is not limited to a plurality of times of measurement, and a measurement value obtained by one measurement may be defined as the reference optical fiber transmission loss measurement value. The measured reference optical fiber transmission loss measurement value α (s, i) is stored in the storage unit 4.

Continuously, the transmission loss difference value calculation unit 3 calculates a transmission loss difference value ε (s, i) by subtracting the transmission loss reference value α (s, 0) obtained in step S3 from the reference optical fiber transmission loss measurement value α (s, i) measured in step S4 (Step S5: difference value calculation step).

The calculated transmission loss difference value ε (s, i) is stored in the storage unit 4 (step S6). The transmission loss difference value is stored in the storage unit 4, for example, every day when a transmission loss value of the reference optical fiber is measured and the transmission loss difference value ε (s, i) (i=1, 2, . . . ) is calculated.

Based upon a plurality of transmission loss difference values ε (s, 1), c (s, 2), . . . stored in the storage unit 4, the transmission loss value calculation unit 5 calculates a correction value ε for correcting a measurement value of the transmission loss of the optical fiber to be measured (measurement value of the optical fiber to be measured) (step S7). Calculation of the correction value ε is performed based upon the plurality of transmission loss difference values ε (s, i) obtained in a predetermined period in the order close to a point of time when the measurement of the transmission loss of the optical fiber to be measured is performed. The calculation of the correction value ε is obtained by averaging the obtained plurality of transmission loss difference values ε (s, i). For example, the correction value c is obtained by averaging the transmission loss difference values ε (s, i) for five times from the day when the transmission loss of the optical fiber to be measured is measured to four days before.

The predetermined period may be determined based upon a tendency that the transmission loss difference value ε (s, i) changes. For example, when a tendency of a change over time such as increasing or decreasing of the transmission loss difference values is recognized by referring to the plurality of transmission loss difference values ε (s, 1), ε (s, 2), . . . stored in the storage unit 4, the correction value ε may be calculated by using the transmission loss difference value ε (s, i) for the number of days when the change in the tendency is stable immediately after the measurement is performed.

In order to correct a measurement value of the optical fiber to be measured α (mea), the calculated correction value ε is outputted (step S8).

(Loss measurement of Optical Fiber to be Measured)

The measurement unit 2 measures the transmission loss of the optical fiber to be measured which is a measurement target (step S9: measurement step of the optical fiber to be measured).

The measurement value of the transmission loss of the optical fiber to be measured (measurement value of the optical fiber to be measured α (mea)) measured in step S9 is corrected by using the correction value ε calculated in step S8, and a transmission loss value α' of the optical fiber to be measured is obtained (step S10). For example, the transmission loss value α' of the optical fiber to be measured is obtained by subtracting the correction value ε outputted in step S8 from the measurement value of the optical fiber to be measured α (mea) measured in step S9.

The transmission loss value α' obtained in step S10 is displayed on, for example, a display device (not illustrated) of the OTDR measurement device 1 (step S11).

When the correction value c calculated in step S7 is too large, it is considered that the OTDR measurement device 1 is out of order. Here, for example, a variation in the reference optical fiber transmission loss measurement value stored in the storage unit 4 is obtained in advance, and when the correction value exceeds the variation, it may be determined that the OTDR measurement device 1 is out of order.

According to the OTDR measurement device 1 and the method for measuring the transmission loss of the optical fiber, the measurement of the reference optical fiber transmission loss is repeatedly performed, and the transmission loss difference value ε (s, i) is calculated every time the reference optical fiber transmission loss measurement value α (s, i) is obtained. Next, the correction value ε is calculated based upon the calculated plurality of transmission loss difference values ε (s, i), and the measurement value of the optical fiber to be measured α (mea) is corrected by using the calculated correction value ε. Therefore, for example, at the time of starting the daily manufacturing operation, the correction value ε is calculated from the latest measurement value considered to be relatively close to a current state among the reference optical fiber transmission loss measurement values α (s, i), and the measurement value of the optical fiber to be measured α (mea) may be corrected by the correction value ε. Therefore, it is possible to correct the variation (deviation) in the measurement value of the transmission loss caused by a change over time and a change in a temperature environment in the OTDR measurement device 1, and it is possible to sufficiently perform the quality control according to a standard for the optical fiber to be measured.

The correction value ε is calculated by averaging the plurality of transmission loss difference values ε (s, i) obtained in the predetermined period in the order close to the point of time when the measurement of the transmission loss of the optical fiber to be measured is performed. Therefore, since the measurement value of the transmission loss of the optical fiber to be measured α (mea) may be corrected by using the averaged correction value ε, it is possible to more surely correct the variation in the measurement value caused by the change over time and the change in the temperature environment.

When the plurality of transmission loss difference values ε (s, i) for calculating the averaged correction value are obtained from the predetermined period, for example, a period during which the change in the transmission loss difference value ε (s, i) is stable to some extent may be determined as the predetermined period. Therefore, it is possible to more surely correct the variation in the measurement value caused by the change over time and the change in the temperature environment.

When the transmission loss of the reference optical fiber is measured, it is possible to define the average value of the plurality of measurement values obtained by performing the plurality of times of measurement as the reference optical fiber transmission loss measurement value $\alpha$ (s, i). Therefore, the reference optical fiber transmission loss measurement value $\alpha$ (s, i) may be set to a more accurate measurement value.

While the present invention has been described in detail and with reference to a specific embodiment, it is apparent to those skilled in the art that various modifications and corrections may be made without departing from the spirit and scope of the present invention. The number, position, and shape of the component described above are not limited to those in the above-described embodiment, and may be modified to the number, position, and shape suitable for performing the present invention.

REFERENCE SIGNS LIST

1: OTDR measurement device
2: measurement unit
3: transmission loss difference value calculation unit
4: storage unit
5: transmission loss value calculation unit
10: optical fiber (reference optical fiber, optical fiber to be measured)
20: pulse generator
21: light source
22: directional coupler
23: optical connector
24: light receiving unit
25: amplifier
26: signal processing device

The invention claimed is:

1. A method for measuring a transmission loss of an optical fiber comprising:
   measuring a loss wavelength characteristic of a reference optical fiber;
   measuring a loss measurement error caused by a wavelength deviation caused by a spectroscope, and correcting the loss measurement error;
   obtaining a transmission loss of the reference optical fiber based on the measurements and the correction as a transmission loss reference value;
   measuring a reference optical fiber transmission loss measurement value of the reference optical fiber by using an OTDR measurement device;
   calculating a transmission loss difference value by subtracting the transmission loss reference value from the reference optical fiber transmission loss measurement value measured in the measurement of the reference optical fiber transmission loss measurement value; and
   measuring a transmission loss of an optical fiber to be measured by using the OTDR measurement device, wherein
   the measurement of the reference optical fiber transmission loss measurement value is repeatedly performed, the transmission loss difference value is calculated by performing the calculation every time the reference optical fiber transmission loss measurement value is obtained, a correction value is calculated based upon the calculated plurality of transmission loss difference values, a measurement value obtained in the measurement of the transmission loss of the optical fiber to be measured is corrected by using the correction value, and a transmission loss value of the optical fiber to be measured is obtained.

2. The method for measuring the transmission loss of the optical fiber according to claim 1, wherein
   the correction value is calculated by averaging the plurality of transmission loss difference values obtained in a predetermined period in the order close to a point of time when the measurement of the transmission loss of the optical fiber to be measured is performed.

3. The method for measuring the transmission loss of the optical fiber according to claim 2, wherein
   the predetermined period is determined based upon a tendency that the transmission loss difference value changes.

4. The method for measuring the transmission loss of the optical fiber according to claim 3, wherein
   an average value of a plurality of measurement values obtained by performing a plurality of times of measurement of the reference optical fiber transmission loss measurement value is defined as the reference optical fiber transmission loss measurement value.

5. The method for measuring the transmission loss of the optical fiber according to claim 2, wherein
   an average value of a plurality of measurement values obtained by performing a plurality of times of measurement of the reference optical fiber transmission loss measurement value is defined as the reference optical fiber transmission loss measurement value.

6. The method for measuring the transmission loss of the optical fiber according to claim 1, wherein
   an average value of a plurality of measurement values obtained by performing a plurality of times of measurement of the reference optical fiber transmission loss measurement value is defined as the reference optical fiber transmission loss measurement value.

* * * * *